United States Patent [19]

Otsuka et al.

[11] 4,362,683
[45] Dec. 7, 1982

[54] APPARATUS AND METHOD FOR PRODUCING A CONTINUOUS NIB ROD FOR A WRITING INSTRUMENT

[75] Inventors: Katsumi Otsuka, Funabashi; Tetsuo Shimoishi, Hamamatsu, both of Japan

[73] Assignees: Teibow Company Limited, Shizuoka; Toplan Manufacturing Inc., Saitama, both of Japan

[21] Appl. No.: 252,043

[22] Filed: Apr. 8, 1981

[30] Foreign Application Priority Data

Apr. 14, 1980 [JP] Japan ................. 55-48880

[51] Int. Cl.³ ........................................... B29D 23/04
[52] U.S. Cl. ................... 264/167; 264/177 F; 264/209.1; 264/209.8; 401/196; 401/265; 425/376 A; 425/381; 425/466; 425/467
[58] Field of Search .......... 425/466, 467, 381, 376 A; 264/209.8, 167, 209.1, 150, 177 F; 401/265, 196

[56] References Cited

U.S. PATENT DOCUMENTS

| | | | |
|---|---|---|---|
| 1,849,431 | 3/1932 | Mayhew | 425/466 |
| 3,518,019 | 6/1970 | Nakamura | 401/265 |
| 3,538,208 | 11/1970 | Ohtsuka | 264/150 |
| 3,545,043 | 12/1970 | Schwindy | 425/114 |
| 3,551,951 | 1/1971 | Schiesser | 425/376 A |
| 3,778,495 | 12/1973 | Woolley | 425/467 |
| 3,899,276 | 8/1975 | Sokolow | 425/467 |
| 3,933,965 | 1/1976 | Gallone et al. | 264/177 F |
| 4,022,603 | 5/1977 | Roeder et al. | 425/381 |
| 4,076,428 | 2/1978 | Otake et al. | 401/265 |
| 4,279,857 | 7/1981 | Feuerherm | 425/466 |

FOREIGN PATENT DOCUMENTS

| | | | |
|---|---|---|---|
| 2805975 | 8/1978 | Fed. Rep. of Germany | 264/167 |
| 300233 | 6/1971 | U.S.S.R. | 425/381 |

*Primary Examiner*—Jeffery R. Thurlow
*Attorney, Agent, or Firm*—Burgess, Ryan and Wayne

[57] ABSTRACT

An apparatus for producing a continuous rod having a capillary or capillaries, adapted for the writing nib of a writing instrument. The apparatus is comprised of a tubular body and a core arranged in the body. The core is provided with a plurality of radial slits. The apparatus is further provided with a restricted portion facing an outer periphery of the core for controlling the amount of melted material passed through the nozzle.

5 Claims, 27 Drawing Figures

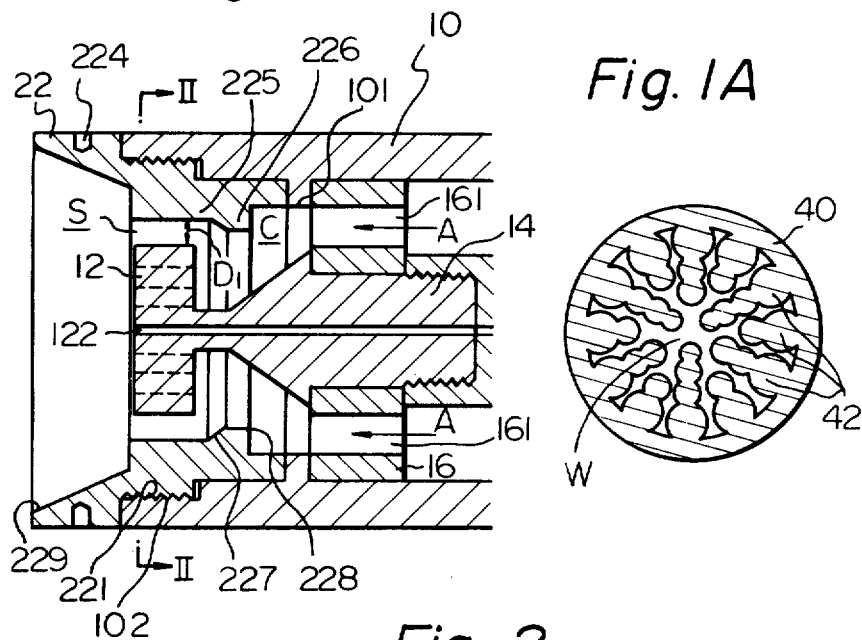
Fig. 1
Fig. 1A
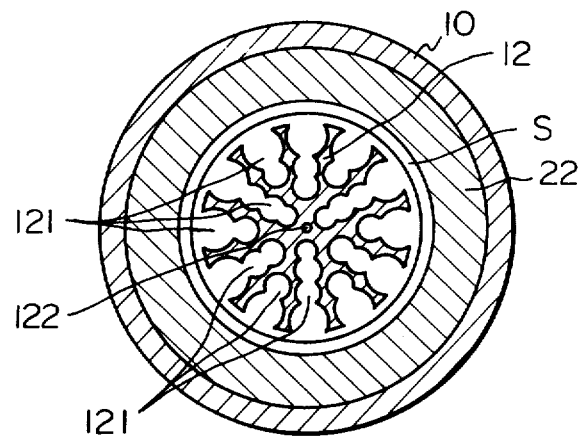
Fig. 2

4,362,683

APPARATUS AND METHOD FOR PRODUCING A CONTINUOUS NIB ROD FOR A WRITING INSTRUMENT

FIELD OF THE INVENTION

The present invention relates to an apparatus for producing a continuous nib rod for use in a writing instrument such as a felt pen.

A continuous nib rod for a felt pen is made by an extruding apparatus comprising a tubular die body and a die disc arranged in the body so that an orifice (or orifices) corresponding to a particular cross-sectional shape of capillary of the nib is (are) formed between the body and the disc. The capillary should have a predetermined area or void ratio so that a proper capillary action is generated to produce a stable flow of ink in accordance with properties of ink. Therefore, the amount of flow of melt plastic material passing through the orifice should be controlled so that the required area of the capillary is obtained in the produced nib. However, in the prior art which is for example disclosed in U.S. Pat. No. 3,538,208 (corresponding to French Pat. No. 1,588,546, Italian Pat. No. 826,807, British Pat. No. 1,170,018, or West Germany Pat. No. 1,729,064), a nozzle of a fixed orifice was used. Therefore, the prior art suffers from a drawback that a nib having a predetermined area of capillary can be produced only with difficulty.

SUMMARY OF THE INVENTION

An object of the present invention is to provide a die apparatus capable of producing a continuous rod of a required area of a capillary.

Another object of the present invention is to provide a die apparatus capable of easily producing a nib rod of a required area of a capillary.

According to the present invention a die apparatus for producing a writing nib made of a synthetic plastic material is disclosed, said apparatus comprising:

a die body of substantially tubular shape through which a flow of melted plastic material passes;

a die core arranged in die body, said die core having a plurality of angularly spaced outwardly opened slits extending along the length of the die core therethrough, and;

a ring shaped nozzle member having an inner throttle portion arranged around the core so that an orifice (or orifices) having a cross-sectional shape corresponding to that of the capillary in the nib(s) is (or are) formed between the throttle portion and the die core, said member being movably connected to the die body for controlling the minimum distance between the throttle portion and the core for controlling a flow rate of the melted plastic material passing through the orifice (or the orifices).

BRIEF DESCRIPTION OF ATTACHED DRAWINGS

FIG. 1 shows a longitudinal cross-section of a die apparatus of the present invention;

FIG. 2 shows a transverse cross-section along line II—II of FIG. 1;

FIG. 1A is a cross-section of a nib made by the arrangement of FIG. 1.

DETAILED DESCRIPTION OF PREFERRED EMBODIMENTS

Figures 3, 3A:
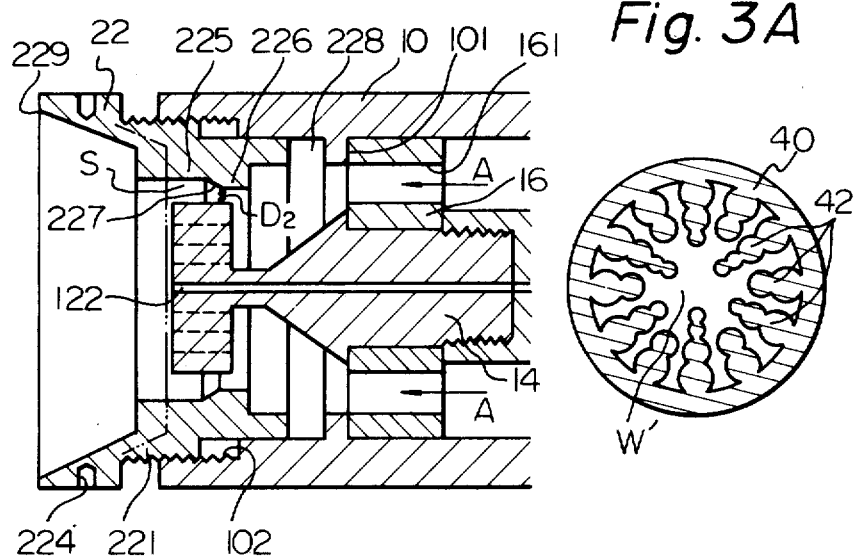
FIG. 3 is the same as FIG. 1 except that the nozzle has been removed.
FIG. 3A is a cross-section of nib made according to the arrangement of FIG. 3.

Referring to FIG. 1, a die apparatus of the present invention comprises a die body 10 of a tubular shape. The rear end of the die body (not shown) is connected to an extrusion screw apparatus for providing a forced flow of melted synthetic plastic material. Arranged in the die body 10 is a die core 12 made as a circular disc member. The die core 12 is provided with a plurality of angularily spaced and outwardly opened slits 121 extending along the length of the core. Cross-sectional shapes of the slits are determined by the shape of a cross-section of a nib to be made. In this embodiment each of the slits 121 has, in the cross-section, a profile comprised of a link of portional circles. The die core 12 has at its rear end a rod portion 14 which is inserted into a support plate 16. The support plate 16 is fixedly inserted into the tubular body 10 so that it abuts the annular shoulder portion 101 of the tubular body. The die core 12 is provided with a vent passage 122 which is on one end opened to a front side surface of the core member 12, and on the other side opened to the atmosphere.

According to the present invention, the apparatus is further provided with a nozzle member 22 being substantially ring shaped. The nozzle member 22 has a screw thread portion 221 screwed into a screw threaded hole 102 formed at the front open end of the die body 10. The nozzle member 22 is arranged around the die core member 12 so that an orifice S is formed between the outer ring 22 and the core 12. The orifice S has a predetermined cross-sectional shape corresponding to a required cross-sectional shape of the writing nib. The cross-section is, in this embodiment, comprised of an outer circle and a plurality of radially extending projections each of which forms a linkage of portional circles (FIGS. 1A and 3A).

Due to the screw connection, the nozzle member 22 may be located on a predetermined selected position with respect to the die body 10. This adjustment is easily affected by engaging a tool with holes 224 formed at the outer periphery of the ring 22. As shown in FIG. 1, the nozzle member 22 is provided with a throttle portion 225 of a smaller diameter. The throttle portion is provided with an annular projection 226 projected upwardly inwardly to control the effective flow area of the annular passageway. The projection 226 forms at the front end a tapered surface 227 to generate a laminar flow of melt to be discharged from the nozzle 22.

During the operation of the apparatus in FIG. 1, a flow of melted material from a extruder mechanism (not shown) is, via holes 161 in the support member 16 as shown by arrows A, introduced into an inlet end 228 of the nozzle 22. The flow of melted material is then passed through an orifice S formed between the inner surface of the throttle portion 225 and the plurality of slits 121 in the inner member 12. The material passed through the orifice S is discharged from the outlet end 229 of the outer ring member 22, so that a continuous plastic rod having a cross-sectional shape as shown by FIGS. 1A and 3A corresponding to that of the orifice S is obtained. The cross-section of the obtained rod is comprised of outer portions 40 and a plurality of equiangularly spaced ribs 42 each of which is comprised of portional circles, so that a capillary conduit W or W' is formed between the ring portion 40 and rib portions 42. It should be noted that the vent hole 122, during the discharge from the orifice, connects a space W or W' of the nib rod, being produced, with atmospheric air pressure, so that the nib rod having spaces W or W' can be obtained.

The smallest distance $D_1$ or $D_2$ between the inner surface of the throttle portion and the outer surface of the core 12 corresponds to an effective flow area of the orifice. The effective flow area determines the amount of the melted material passed through the orifice.

According to the present invention the nozzle 22 provided with the throttled portion 225 may be axially movable between the position as shown in FIG. 1 and a position as shown in FIG. 3. At the position in FIG. 1, since the distance is as large as $D_1$ the effective flow area is large so that the amount of the material passed through the orifice S is large. As a result of this, a material discharged from the orifice has a small area of a capillary W as shown in FIG. 1A.

At the position of FIG. 3, since the distance is as small as $D_2$, the effective flow area is small so that a small flow rate of the melt material is realized. As a result of this the continuous nib rod discharged from the orifice has a large area of capillary W' as shown in FIG. 3A.

As will be clear from the above, the present invention makes it possible to control the amount of flow of material merely by turning the nozzle 22. As a result of this, a continuous nib rod of a predetermined area of capillary can be easily produced.

Figure 4:
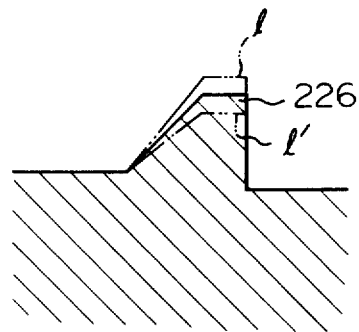
FIG. 4 shows an enlarged view of throttle projection.
Figure 5:
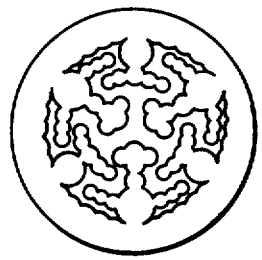
FIGS. 5 through 23 and FIG. 23A show other examples of cross-sections of the nib obtained by the die apparatus of the present invention.
Figure 6:
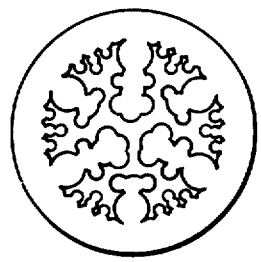
Figure 7:
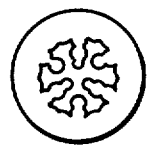
Figure 8:
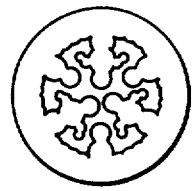
Figure 9:
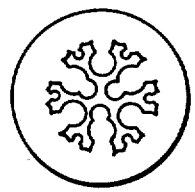
Figure 10:
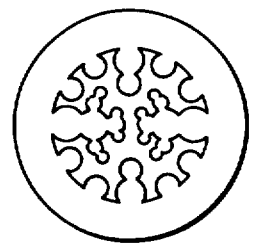
Figure 11:
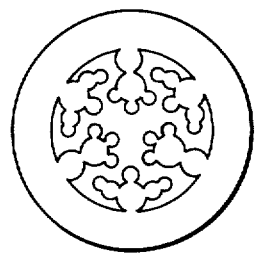
Figure 12:
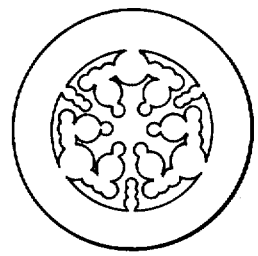
Figure 13:
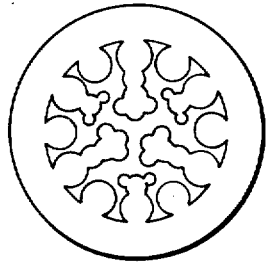
Figure 14:
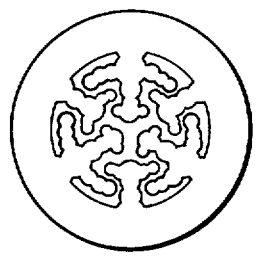
Figure 15:
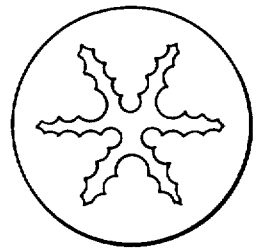
Figure 16:
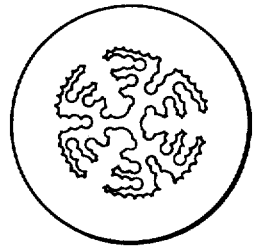
Figure 17:
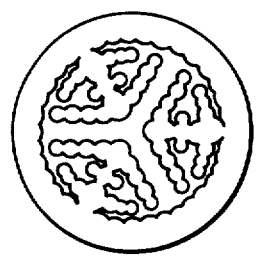
Figure 18:
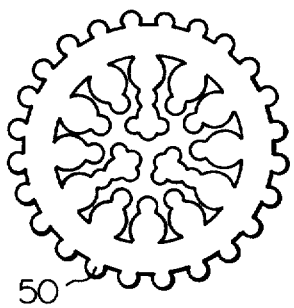
Figure 19:
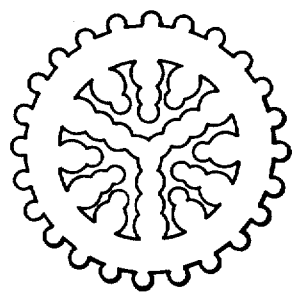
Figure 20:
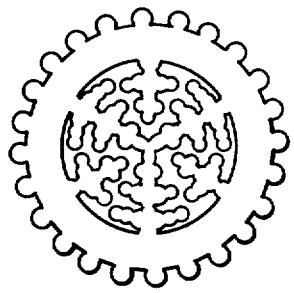
Figure 21:
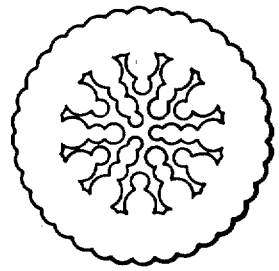
Figure 22:
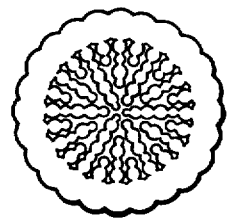

It should be noted that the flow control portion 226 may be suitably sized as shown by the dotted lines l and l' in FIG. 4.

The control ring 22 may be equally used when producing writing nibs as shown in FIGS. 5-17. However, in each case a core member having a specified cross-section corresponding to that of the nib should be used.

In extruding the nibs as shown in FIGS. 18-23, the nozzle ring 22 is at the inner surface thereof, provided with equiangularly spaced longitudinally extending grooves. Therefore, writing nibs having axially extending outer projections 50 such as shown by a reference numeral 50 in FIG. 18 may be obtained. It should be noted that, in the case of the nibs in FIGS. 19 and 20, a plurality of vent hole are necessary since the nibs have a plurality of capillaries.

Figure 23:
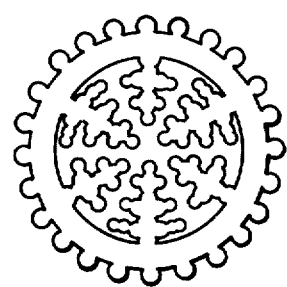
Figure 23A:
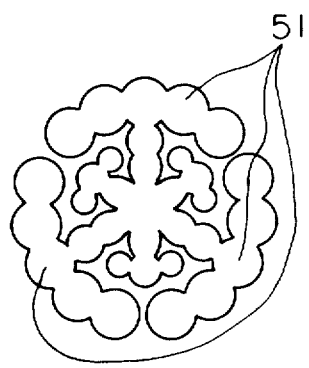

When making a nib as shown in FIG. 23A, the core is provided with angularly spaced portions contacting the inner surface of the die body. As a result of this the nib has, at the cross-section thereof, a plurality of separated outer portions 51.

Figure 24:
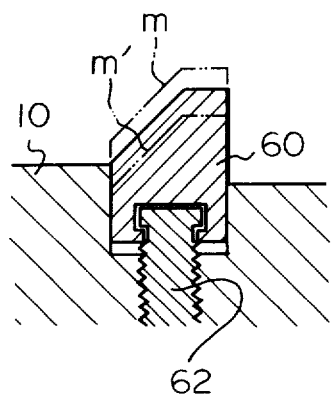
FIG. 24 shows another embodiment of the throttle means.

In another embodiment shown in FIG. 24 a flow control ring is made of a plurality of arc members 60, each of which is radially slidable with respect to a body 10 by means of a respective screw 62. The members 60 are displaced along the radial direction between position m and m'. As a result of this a predetermined selected effective flow area is obtained similar to the embodiment in FIG. 1.

In the embodiments shown in the drawings the nozzle 22 is screwed to the body 10 in order to control dimension of the orifice S. However, other connection means may be utilized for movably connecting the nozzle 22 to the body 10. For example, the nozzle 22 is axially slidably inserted into the body, a stop screw is used for obtaining a predetermined fixed position of the nozzle with respect to the body.

Many modifications and changes may be made by those skilled in this art without departing from the scope of the invention.

We claim:

1. A die apparatus for producing a writing nib made of a synthetic material, said writing nib being comprised, in cross-section, of at least one base portion and rib portions extending in cantilever fashion from the base portion so as to produce a capillary in the nib therebetween, said apparatus comprising:
   a die body of substantially tubular shape through which a flow of molten synthetic plastic material may pass;
   a die core arranged in the die body, said die core having a plurality of angularly spaced radial slits extending along the length of the die core;
   a nozzle member arranged around the die core so that at least one orifice having a cross-sectional shape corresponding to that of the nib is formed between the nozzle member and the die core, said orifice having in cross-section at least one first section and a plurality of second sections corresponding to the base portion and the rib portions, respectively, of the nib; and
   an integral throttle portion extending from the inner surface of the nozzle member toward the outer periphery of the die core, said throttle portion being arranged adjacent to the inlet of the orifice so as to act on plastic material flow in the first section and the second sections of the orifice;
   said nozzle member being movably connected to the die body for controlling the minimum distance between the throttle portion and the die core to provide a desired flow rate of plastic material passing through the first section and the second sections, thereby producing a writing nib of desired capillary area.

2. A die apparatus according to claim 1, wherein said member is axially movably connected to the die body by a screw connection, and wherein the throttle portion comprises an annular projection.

3. A die apparatus according to claim 2, wherein said projected portion is at the rear end thereof forming a tapered surface.

4. The apparatus according to claim 1, wherein said radial slits divides said die core into a plurality of ribs comprising portional circles.

5. A method for assembling a die apparatus for producing a writing nib made from synthetic plastic material of a desired capillary area, said writing nib being comprised in cross-section by at least one base portion and a plurality of rib portions, said method comprising the steps of:
   providing a die body of substantially tubular shape;
   arranging a die core in the die body, the die core having a plurality of angularly spaced slits extending along the length of the die core therethrough;
   arranging a nozzle member around the die core so that at least one orifice having a cross-sectional shape corresponding to that of the nib is formed only between the nozzle member and the die core, said orifice having in cross-section at least one first section and a plurality of second sections corresponding to the base portion and the rib portions, respectively, of the nib;

providing a throttle portion on the inner surface of the nozzle member at a position adjacent to the inlet of the orifice;

introducing a pressurized flow of melted plastic material into the inlet of the orifice;

taking out a continuous nib rod from the orifice; and moving the nozzle member along the length of the die body so that the throttle portion is located on a position with respect to the inlet of the orifice, thereby obtaining a desired length of the rib, i.e., a desired capillary area in the nib.

* * * * *